US012252377B2

(12) United States Patent
Babu

(10) Patent No.: US 12,252,377 B2
(45) Date of Patent: Mar. 18, 2025

(54) STRUCTURE FOR A GUIDE PILLAR SYSTEM OF A PNEUMATIC VACUUM ELEVATOR

(71) Applicant: Killakathu Ramanathan Babu, Tamilnadu (IN)

(72) Inventor: Killakathu Ramanathan Babu, Tamilnadu (IN)

(73) Assignee: Killalathu Ramanathan Babu (IN)

( * ) Notice: Subject to any disclaimer, the term of this patent is extended or adjusted under 35 U.S.C. 154(b) by 0 days.

(21) Appl. No.: 17/928,636

(22) PCT Filed: Oct. 5, 2021

(86) PCT No.: PCT/IB2021/059114
§ 371 (c)(1),
(2) Date: Nov. 30, 2022

(87) PCT Pub. No.: WO2023/021322
PCT Pub. Date: Feb. 23, 2023

(65) Prior Publication Data

US 2024/0300779 A1 Sep. 12, 2024

(30) Foreign Application Priority Data

Aug. 17, 2021 (IN) .............................. 202141037314

(51) Int. Cl.
*B66B 7/02* (2006.01)
*B66B 9/04* (2006.01)

(52) U.S. Cl.
CPC .............. *B66B 7/022* (2013.01); *B66B 7/024* (2013.01); *B66B 9/04* (2013.01)

(58) Field of Classification Search
CPC ............ B66B 7/024; B66B 7/022; B66B 9/04
See application file for complete search history.

(56) References Cited

U.S. PATENT DOCUMENTS 11,414,302 B1 * 8/2022 De Ledebur ............ B66B 19/00
11,780,707 B1 * 10/2023 de Ledebur ............ B66B 7/048
187/408
12,024,404 B2 * 7/2024 Babu ....................... B66B 7/022

FOREIGN PATENT DOCUMENTS

CN 104401851 A * 3/2015
CN 103863918 A 7/2016
(Continued)

OTHER PUBLICATIONS

Machine Translation of CN 103863918.*

*Primary Examiner* — Diem M Tran
(74) *Attorney, Agent, or Firm* — Jason C. Cameron

(57) ABSTRACT

A structure for a guide pillar system is disclosed. The structure includes a central hollow pillar section 20 which includes at least four sides including a first side 30, a second side 40, a third side 50, and a fourth side 60. The central hollow pillar section 20 also includes at least three grooved rib profiles 70 adapted to mechanically couple the central hollow pillar section 20 to elevator component(s). The at least three grooved rib profiles 70 are attached to an inner surface of the first side 30, the second side 40, and the third side 50. The structure also includes at least two curved sections 80 positioned at a first predefined portion of an outer surface of the first side 30 and the third side 50. The at least two curved sections 80 are adapted to provide structural integrity and radius edge(s) to the fourth side 60 of the central hollow pillar section 20.

9 Claims, 8 Drawing Sheets

(56) References Cited

FOREIGN PATENT DOCUMENTS

| | | | | | |
|---|---|---|---|---|---|
| CN | 104787645 | B | | 6/2018 | |
| EP | 3498650 | A2 | | 11/2020 | |
| KR | 20180073037 | A | | 2/2019 | |
| WO | WO-2022175730 | A1 | * | 8/2022 | ............... B66B 9/04 |
| WO | WO-2023021321 | A1 | * | 2/2023 | ............... B66B 9/04 |

* cited by examiner

STRUCTURE FOR A GUIDE PILLAR SYSTEM OF A PNEUMATIC VACUUM ELEVATOR

CROSS-REFERENCE TO RELATED APPLICATION

This Application claims priority from a Patent application filed in India having Patent Application No. 202141037314, filed on Aug. 17, 2021, and titled "A STRUCTURE FOR A GUIDE PILLAR SYSTEM OF A PNEUMATIC VACUUM ELEVATOR" and a PCT Application No. PCT/IB2021/059114 filed on Oct. 5, 2021, and titled "A STRUCTURE FOR A GUIDE PILLAR SYSTEM OF A PNEUMATIC VACUUM ELEVATOR".

FIELD OF INVENTION

Embodiments of a present disclosure relate to guide rails of a pneumatic vacuum elevator, and more particularly to a structure for a guide pillar system of the pneumatic vacuum elevator.

BACKGROUND

An elevator is a platform or compartment contained in a shaft that is used to raise and lower persons or objects to various levels. Hydraulic elevators, traction elevators, machine-room-less elevators, vacuum pneumatic elevators, shaftless elevators, and others are types of elevators. Various elevators, in general, operate according to different principles. Also, conventionally, different elevators possess different structures for guide rails.

The pneumatic vacuum elevator is one of the many forms of elevators that utilizes air pressure to move a cabin inside a corridor or tubular cylinder that uses air as a working fluid on the cabin's limits. Pneumatic vacuum elevators are commonly employed in countervailing weights to allow the cabin to go up and down between different levels or floors at different heights within the vertical passageways of office buildings, hospitals, industries, and other structures.

Pneumatic vacuum elevators are also provided with the guide rails. However, because the construction of such guide rails is complex, the production process is both hard and time-consuming. Furthermore, due to the intricacy of the structure, such guide rails need extensive maintenance, resulting in a significant maintenance expense. Moreover, such guide rails are heavy, adding weight to the pneumatic vacuum elevators and complicating the installation procedure.

Hence, there is a need for an improved structure for a guide pillar system of a pneumatic vacuum elevator which addresses the aforementioned issues.

BRIEF DESCRIPTION

In accordance with one embodiment of the disclosure, a structure for a guide pillar system of a pneumatic vacuum elevator is provided. The structure includes a central hollow pillar section positioned in an external cylinder of the pneumatic vacuum elevator. The central hollow pillar section includes at least four sides including a first side, a second side, a third side, and a fourth side. The central hollow pillar section also includes at least three grooved rib profiles adapted to mechanically couple the central hollow pillar section to one or more elevator components using a screwing mechanism. Each of the at least three grooved rib profiles are attached to an inner surface of the first side, the second side, and the third side. The structure also includes at least two curved sections positioned at a first predefined portion of an outer surface of the first side and the third side. Each of the at least two curved sections are adapted to provide structural integrity and one or more radius edges to the fourth side of the central hollow pillar section.

In accordance with another embodiment, a structure for a guide pillar system of a pneumatic vacuum elevator is provided. The structure includes a central hollow pillar section positioned in an external cylinder of the pneumatic vacuum elevator. The central hollow pillar section includes at least four sides including a first side, a second side, a third side, and a fourth side. The central hollow pillar section also includes at least three grooved rib profiles adapted to mechanically couple the central hollow pillar section to one or more elevator components using a screwing mechanism. Each of the at least three grooved rib profiles are attached to an inner surface of the first side, the second side, and the third side. The structure also includes at least one curved section positioned at a first predefined portion of an outer surface of the first side or the third side. The at least one curved section is adapted to provide structural integrity and a radius edge to a first edge of the fourth side of the central hollow pillar section. The fourth side includes a second edge, wherein the second edge is adapted to receive an elevator door of the external cylinder of the elevator.

In accordance with yet another embodiment, a pneumatic vacuum elevator with a structure for a guide pillar system. The pneumatic vacuum elevator includes an elevator cabin adapted to carry a passenger for transiting across one or more floors of a building. The pneumatic vacuum elevator also includes an external cylinder positioned concentrically to the elevator cabin externally. The external cylinder includes an elevator door adapted to allow entry and exit of the passenger corresponding to the elevator cabin. Further, the pneumatic vacuum elevator also includes the structure for the guide pillar system mechanically coupled to the elevator cabin. The structure includes a central hollow pillar section positioned in the external cylinder of the pneumatic vacuum elevator. The central hollow pillar section includes at least four sides including a first side, a second side, a third side, and a fourth side. The central hollow pillar section also includes at least three grooved rib profiles adapted to mechanically couple the central hollow pillar section to one or more elevator components using a screwing mechanism. Each of the at least three grooved rib profiles are attached to an inner surface of the first side, the second side, and the third side. The structure also includes at least one curved section positioned at a first predefined portion of an outer surface of the first side or the third side. The at least one curved section is adapted to provide structural integrity and a radius edge to a first edge of the fourth side of the central hollow pillar section. The fourth side includes a second edge, wherein the second edge is adapted to receive an elevator door of the external cylinder of the pneumatic vacuum elevator.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
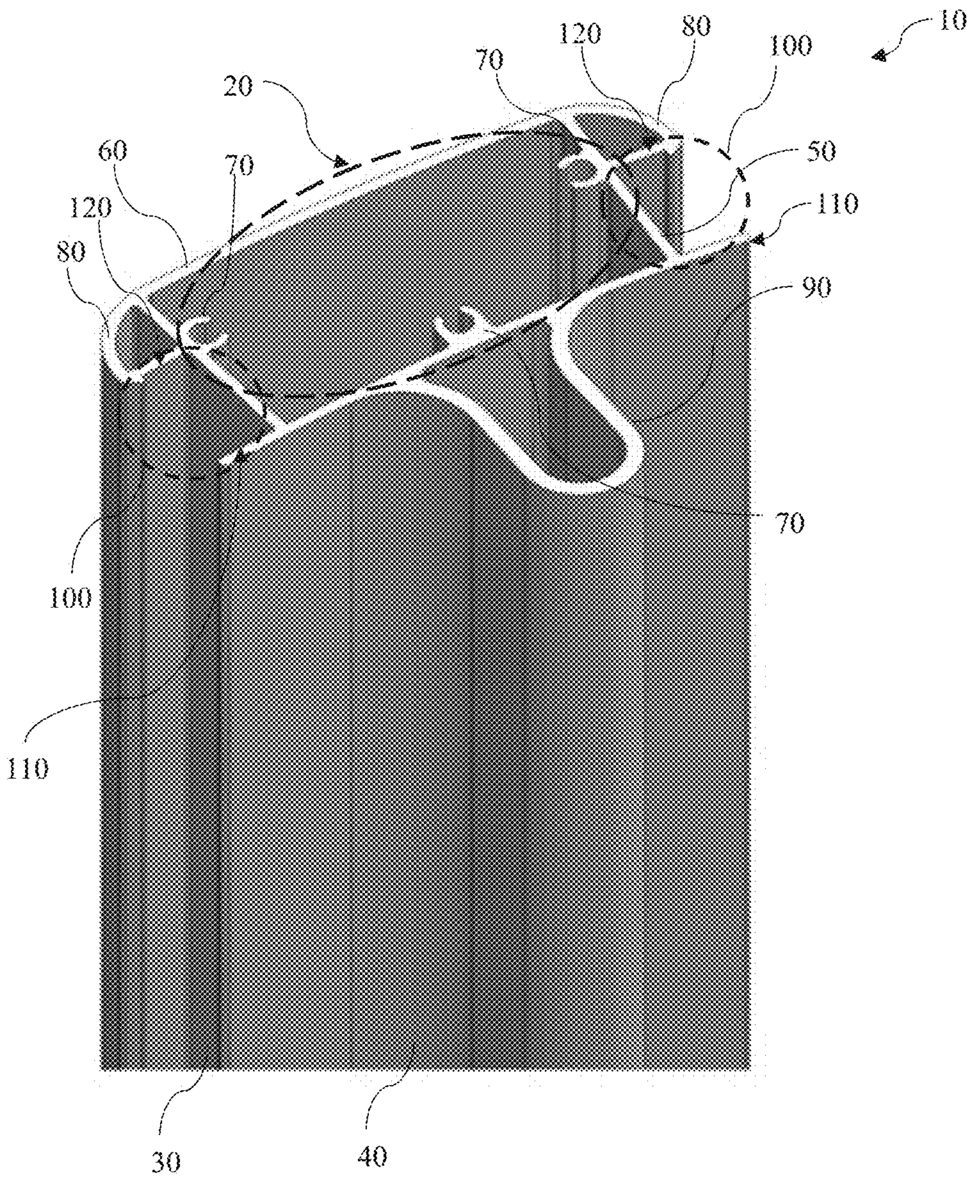
FIG. 1 is a schematic representation of an isometric view of a structure for a guide pillar system of a pneumatic vacuum elevator in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a structure for a guide pillar system of a pneumatic vacuum elevator. As used herein, the term "guide pillar system" is defined as a system that offers a path for an elevator to ascend and descend. The guide pillar system also allows for the safe and precise movement of an elevator cabin and counterweight. Further, as used herein, the term "pneumatic vacuum elevator" is defined as an elevator that uses air pressure to cause the motion of a cabin within a thoroughfare or tubular cylinder that uses the air within it as a working fluid upon the confines of the cabin. In one embodiment, the pneumatic vacuum elevator may include one or more guide pillar systems. Furthermore, the structure described hereafter in FIG. 1 is the structure for the guide pillar system of the pneumatic vacuum elevator.

FIG. 1 is a schematic representation of an isometric view of a structure 10 for a guide pillar system of a pneumatic vacuum elevator in accordance with an embodiment of the present disclosure. The structure 10 includes a central hollow pillar section 20 positioned in an external cylinder of the pneumatic vacuum elevator. The central hollow pillar section 20 includes at least four sides including a first side 30, a second side 40, a third side 50, and a fourth side 60. The central hollow pillar section 20 also includes at least three grooved rib profiles 70 adapted to mechanically couple the central hollow pillar section 20 to one or more elevator components using a screwing mechanism. Each of the at least three grooved rib profiles 70 are attached to an inner surface of the first side 30, the second side 40, and the third side 50.

In one embodiment, the one or more elevator components may include at least one of a base ring, a band ring, a top of the external cylinder, a bottom of the external cylinder, and the like. Also, as used herein, the term "screwing mechanism" is defined as a mechanism that involves fixing one or more parts with each other using one or more mechanical coupling means. In one embodiment, the one or more mechanical coupling means may include at least one of one or more screws, one or more bolts, one or more nuts, and the like.

The structure 10 also includes at least two curved sections 80 positioned at a first predefined portion of an outer surface of the first side 30 and the third side 50. Each of the at least two curved sections 80 are adapted to provide structural integrity and one or more radius edges to the fourth side 60 of the central hollow pillar section 20.

Figure 3:
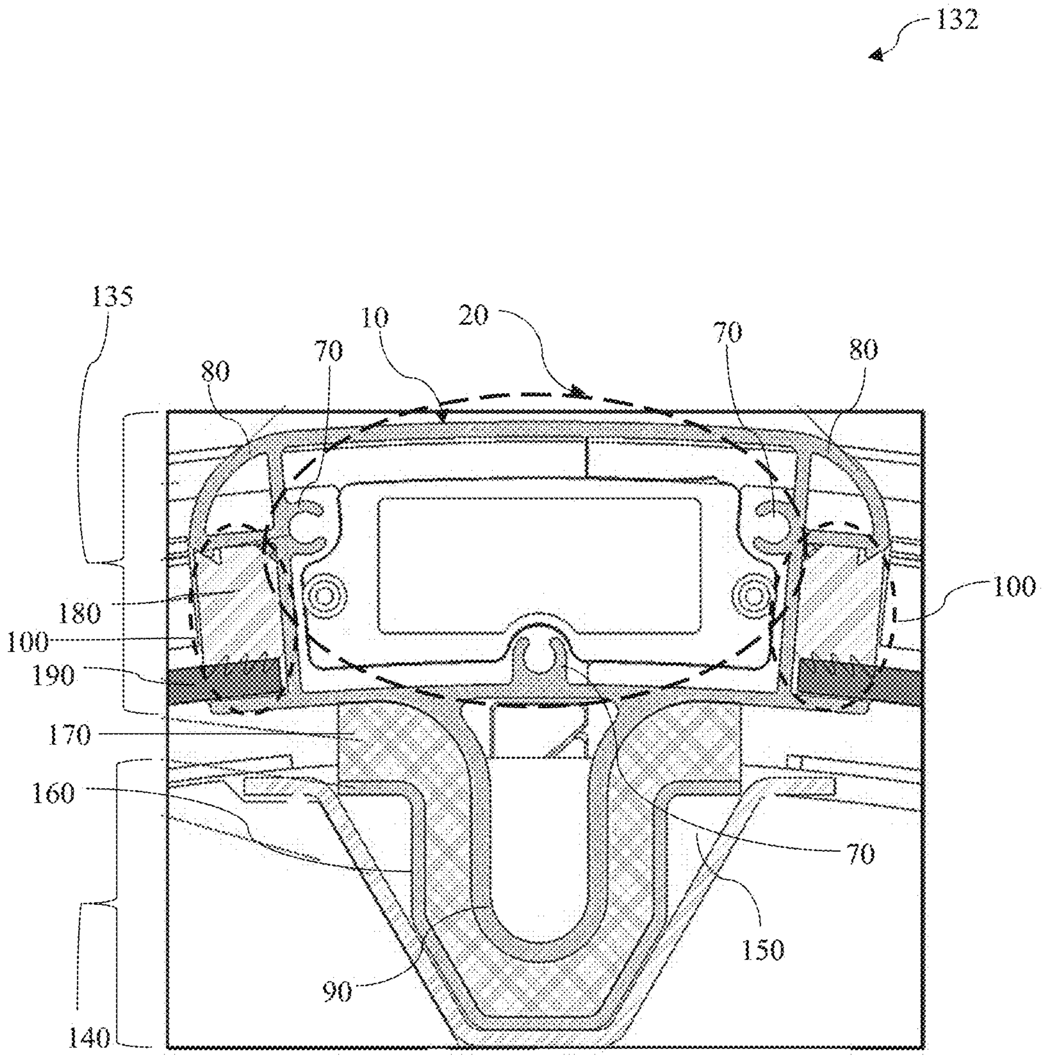
FIG. 3 is a schematic representation of an exemplary embodiment of a cross-section view of an assembly of the structure for the guide pillar system of the pneumatic vacuum elevator of FIG. 1 in an external cylinder and an elevator cabin of the pneumatic vacuum elevator in accordance with an embodiment of the present disclosure.

In one exemplary embodiment, the structure 10 may also include a rail section 90 extruded at an outer surface of the second side 40. The rail section 90 may be adapted to hold an elevator cabin upon mechanically coupling the rail section 90 with a predefined groove (as shown in FIG. 3) on the elevator cabin via one or more coupling components. The rail section 90 may also be adapted to guide the elevator cabin in an upward direction and a downward direction based on predefined criteria. In one embodiment, the predefined criteria may include receiving a request to move in the upward direction, to move in the downward direction, to open an elevator door, to close the elevator door, or the like from a user of the pneumatic vacuum elevator.

Further, in one embodiment, the structure 10 may also include at least two single lip channeled sections 100 positioned at a second predefined portion of the outer surface of the first side 30 and the third side 50. Each of the at least two single lip channeled sections 100 may include a first wall 110 and a second wall 120. Each of the at least two single lip channeled sections 100 may be adapted to receive and support a covering sheet of the external cylinder of the pneumatic vacuum elevator at the first wall 110. In one embodiment, the covering sheet may be transparent, translucent, colored, or the like. In one exemplary embodiment, the covering sheet may include a polycarbonate sheet. Each of the at least two single lip channeled sections 100 may also be adapted to receive and support a rubber beading at the second wall 120.

Figure 2:
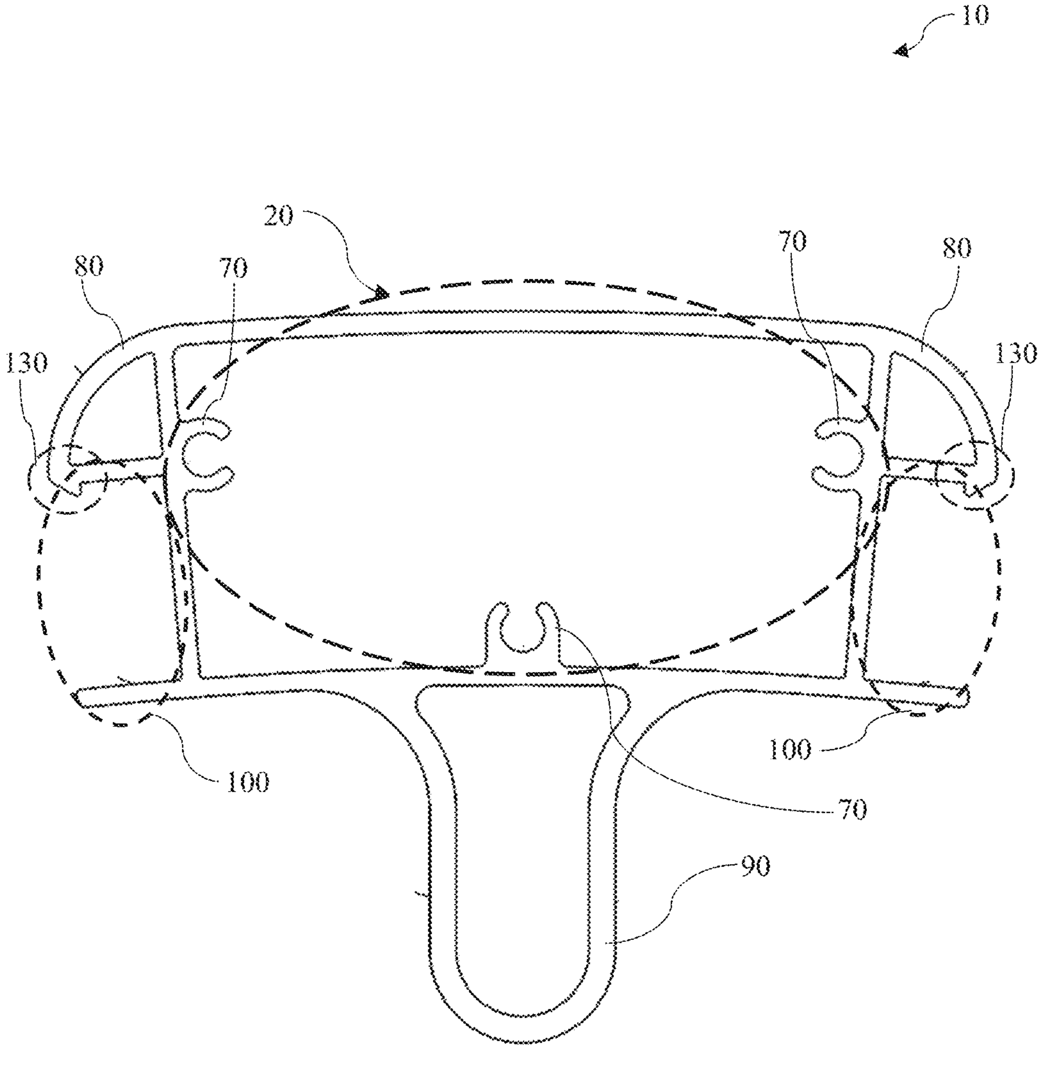
FIG. 2 is a schematic representation of an exemplary embodiment of a cross-section view of the structure for the guide pillar system of the pneumatic vacuum elevator of FIG. 1 in accordance with an embodiment of the present disclosure.

FIG. 2 is a schematic representation of an exemplary embodiment of a cross-section view of the structure 10 for the guide pillar system of the pneumatic vacuum elevator of FIG. 1 in accordance with an embodiment of the present disclosure. In one embodiment, the rail section 90 may be hollow. Also, in an embodiment, the guide pillar system may be manufactured by an aluminum extrusion mechanism. As used herein, the term "aluminum extrusion mechanism" is defined as a process by which aluminum alloy material is forced through a die with a specific cross-sectional profile.

In one exemplary embodiment, the at least two single lip channeled sections 100 may possess a lip-like structure 130 on the second wall 120. In one embodiment, the lip-like structure 130 may have a cuboid shape and be perpendicular to the second wall 120. In such embodiment, the lip-like structure 130 may appear rectangular in the cross-section view or a top view of the guide pillar system. In another embodiment, the lip-like structure 130 may have a tetrahedron shape, a triangular prism shape, or the like. In such embodiment, the lip-like structure 130 may appear triangular in the cross-section view or the top view of the guide pillar system.

FIG. 3 is a schematic representation of an exemplary embodiment of a cross-section view of an assembly 132 of the structure 10 for the guide pillar system of the pneumatic vacuum elevator of FIG. 1 in the external cylinder 135 and the elevator cabin 140 of the pneumatic vacuum elevator in accordance with an embodiment of the present disclosure. In one embodiment, as the rail section 90 is mechanically coupled with the predefined groove 150 of the elevator cabin 140 via the one or more coupling components, the one or more coupling components may include at least one of a guide bracket 160, a carpet layering 170, and the like. In one exemplary embodiment, the guide bracket 160 may be welded with the rail section 90 along with the carpet layering 170 to avoid shaking of the elevator cabin 140 and smooth traveling during movement of the elevator cabin 140. In one exemplary embodiment, the carpet layering 170 may be composed of cloth, nylon, or the like. Also, in an embodiment, as the at least two single lip channeled sections 100 receive and support the rubber beading 180, the rubber beading 180 is adapted to lock the covering sheet 190 of the external cylinder 135 of the pneumatic vacuum elevator between the first wall 110 and the second wall 120.

Figure 4:
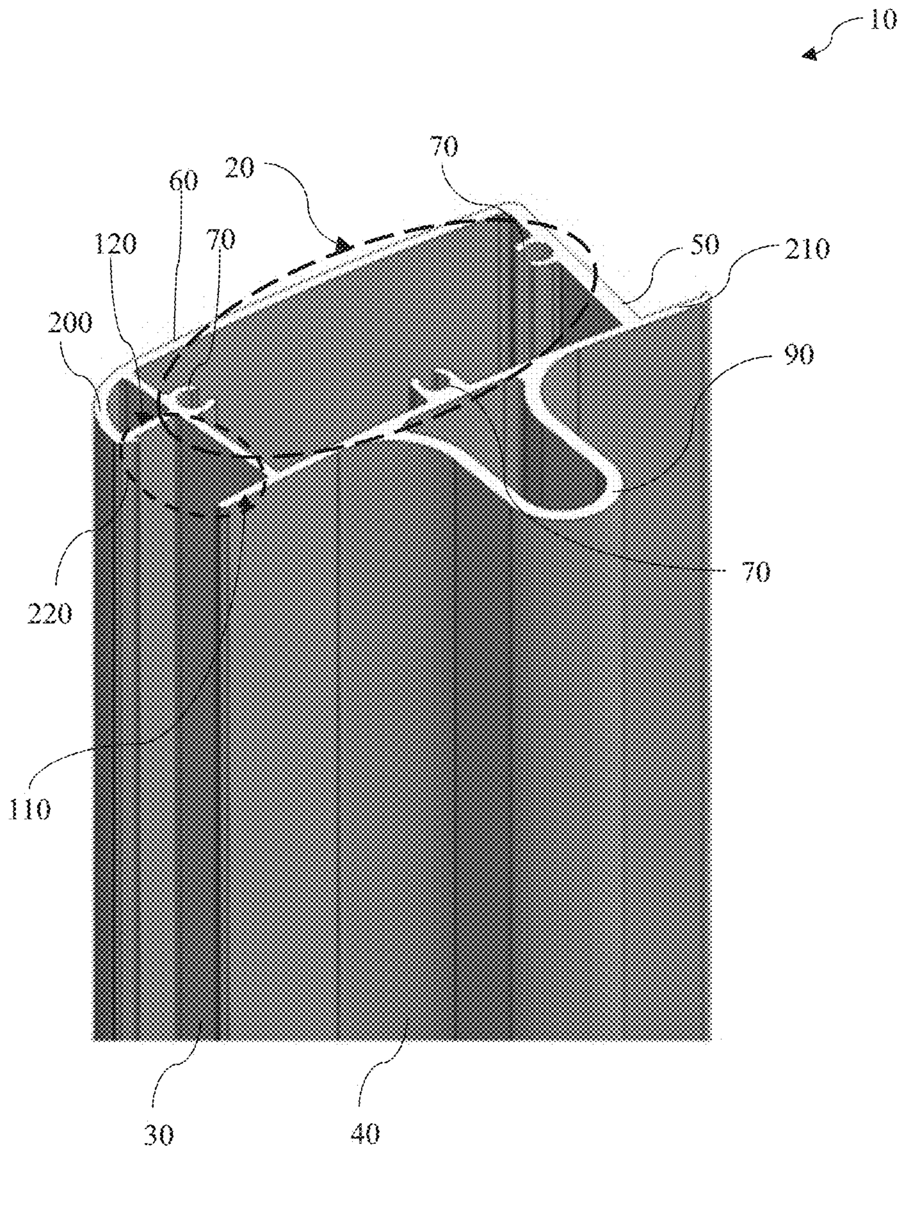
FIG. 4 is a schematic representation of an isometric view of a structure for a guide pillar system of a pneumatic vacuum elevator in accordance with another embodiment of the present disclosure.

FIG. 4 is a schematic representation of an isometric view of the structure 10 for the guide pillar system of the pneumatic vacuum elevator in accordance with another embodiment of the present disclosure. The structure 10 includes the central hollow pillar section 20 positioned in the external cylinder 135 of the pneumatic vacuum elevator. The central hollow pillar section 20 includes the at least four sides including the first side 30, the second side 40, the third side 50, and the fourth side 60. The central hollow pillar section 20 also includes the at least three grooved rib profiles 70 adapted to mechanically couple the central hollow pillar section 20 to the one or more elevator components using the screwing mechanism. Each of the at least three grooved rib profiles 70 are attached to the inner surface of the first side 30, the second side 40, and the third side 50.

The structure 10 also includes at least one curved section 200 positioned at a first predefined portion of an outer surface of the first side 30 or the third side 50. The at least one curved section 200 is adapted to provide structural integrity and a radius edge to a first edge of the fourth side 60 of the central hollow pillar section 20. The fourth side 60 includes a second edge, wherein the second edge is adapted to receive the elevator door of the external cylinder 135 of the pneumatic vacuum elevator.

In one exemplary embodiment, the structure 10 may also include at least one projection 210 positioned on the outer surface of the first side 30 when the at least one curved section 200 is positioned on the third side 50 or the third side 50 when the at least one curved section 200 is positioned on the first side 30. The at least one projection 210 may be adapted to lock the elevator door upon receiving the elevator door at the second edge of the fourth side 60 of the central hollow pillar section 20.

In addition, in one exemplary embodiment, the structure 10 may also include the rail section 90 extruded at the outer surface of the second side 40. The rail section 90 may be adapted to hold the elevator cabin 140 upon mechanically coupling the rail section 90 with the predefined groove 150 on the elevator cabin 140 via the one or more coupling components. The rail section 9X) may also be adapted to guide the elevator cabin 140 in the upward direction and the downward direction based on the predefined criteria.

Subsequently, in an embodiment, the structure 10 may also include at least one single lip channeled section 220 positioned at the second predefined portion of the outer surface of the first side 30 when the at least one curved section 200 is positioned on the third side 50 or the third side 50 when the at least one curved section 200 is positioned on the first side 30. The at least one single lip channeled section 220 may include the first wall 110 and the second wall 120. The at least one single lip channeled section 220 may be adapted to receive and support the covering sheet 190 of the external cylinder 135 of the pneumatic vacuum elevator at the first wall 110. The at least one single lip channeled section 220 may also be adapted to receive and support the rubber beading 180 at the second wall 120.

Figure 5:
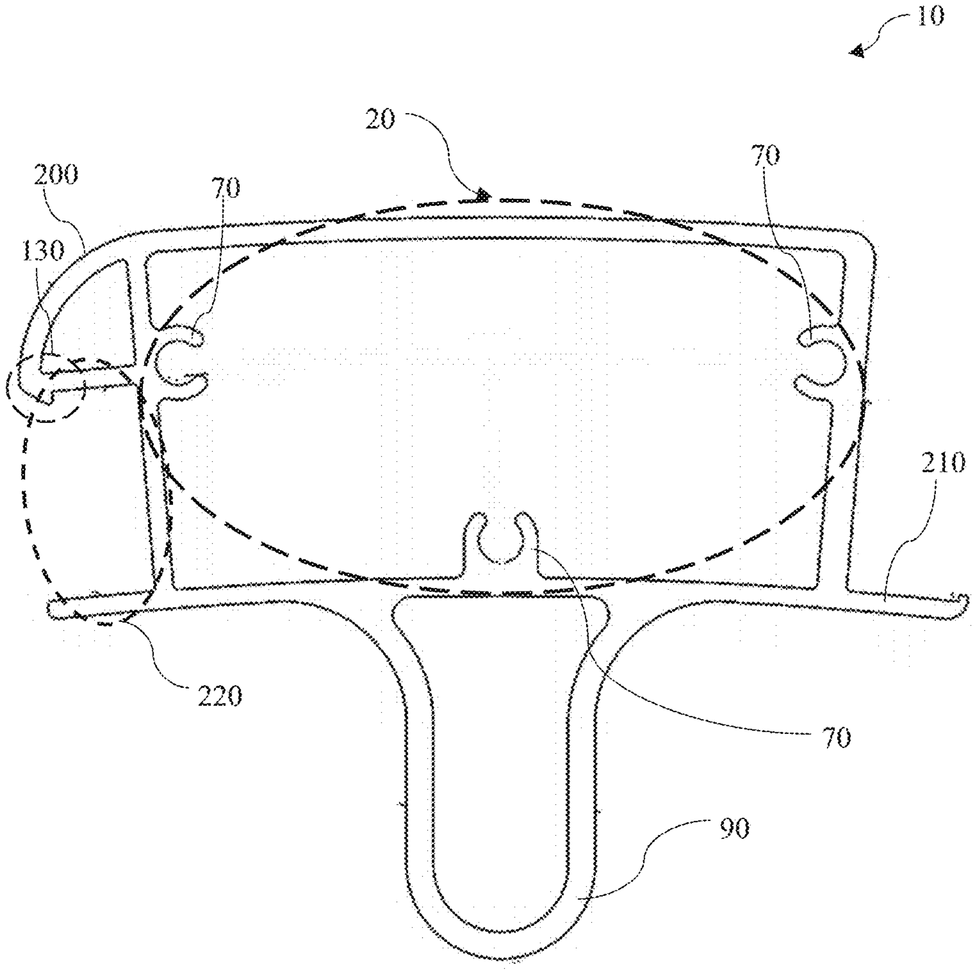
FIG. 5 is a schematic representation of an exemplary embodiment of a cross-section view of the structure for the guide pillar system of the pneumatic vacuum elevator of FIG. 4 in accordance with an embodiment of the present disclosure.

FIG. 5 is a schematic representation of an exemplary embodiment of a cross-section view of the structure 10 for the guide pillar system of the pneumatic vacuum elevator of FIG. 4 in accordance with an embodiment of the present disclosure. In one embodiment, the rail section 90 may be hollow. Also, in an embodiment, the guide pillar system may be manufactured by the aluminum extrusion mechanism. In one exemplary embodiment, the at least one single lip channeled section 220 may include the lip-like structure 130 on the second wall 120.

Figure 6:
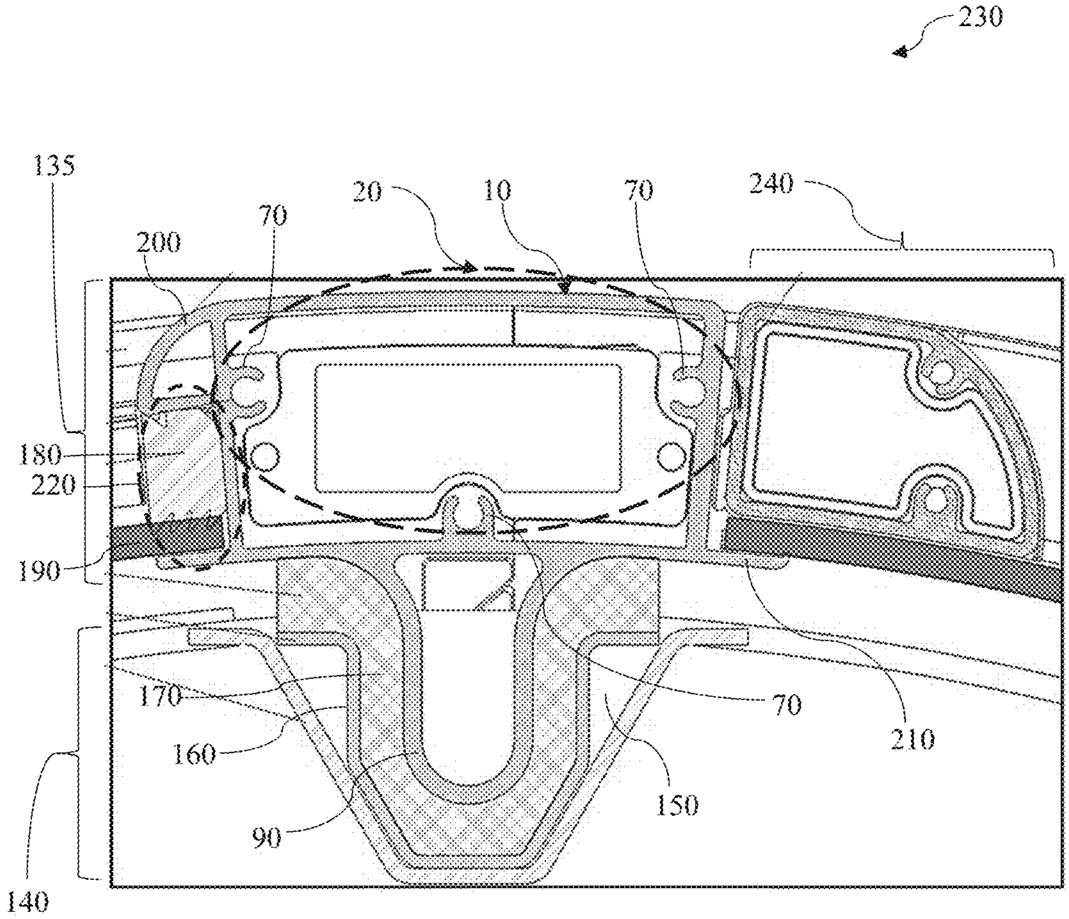
FIG. 6 is a schematic representation of an exemplary embodiment of a cross-section view of an assembly of the structure for the guide pillar system of the pneumatic vacuum elevator of FIG. 4 in an external cylinder and an elevator cabin of the pneumatic vacuum elevator in accordance with an embodiment of the present disclosure.

FIG. 6 is a schematic representation of an exemplary embodiment of a cross-section view of an assembly 230 of the structure 10 for the guide pillar system of the pneumatic vacuum elevator of FIG. 4 in the external cylinder 135 and the elevator cabin 140 of the pneumatic vacuum elevator in accordance with an embodiment of the present disclosure. In one embodiment, as the at least one single lip channeled section 220 receives and support the rubber beading 180, the rubber beading 180 is adapted to lock the covering sheet 190 of the external cylinder 135 of the pneumatic vacuum elevator between the first wall 110 and the second wall 120. In one embodiment, the assembly 230 in FIG. 4 also displays the elevator door 240 housed in the external cylinder 135 of the pneumatic vacuum elevator.

Figure 7:
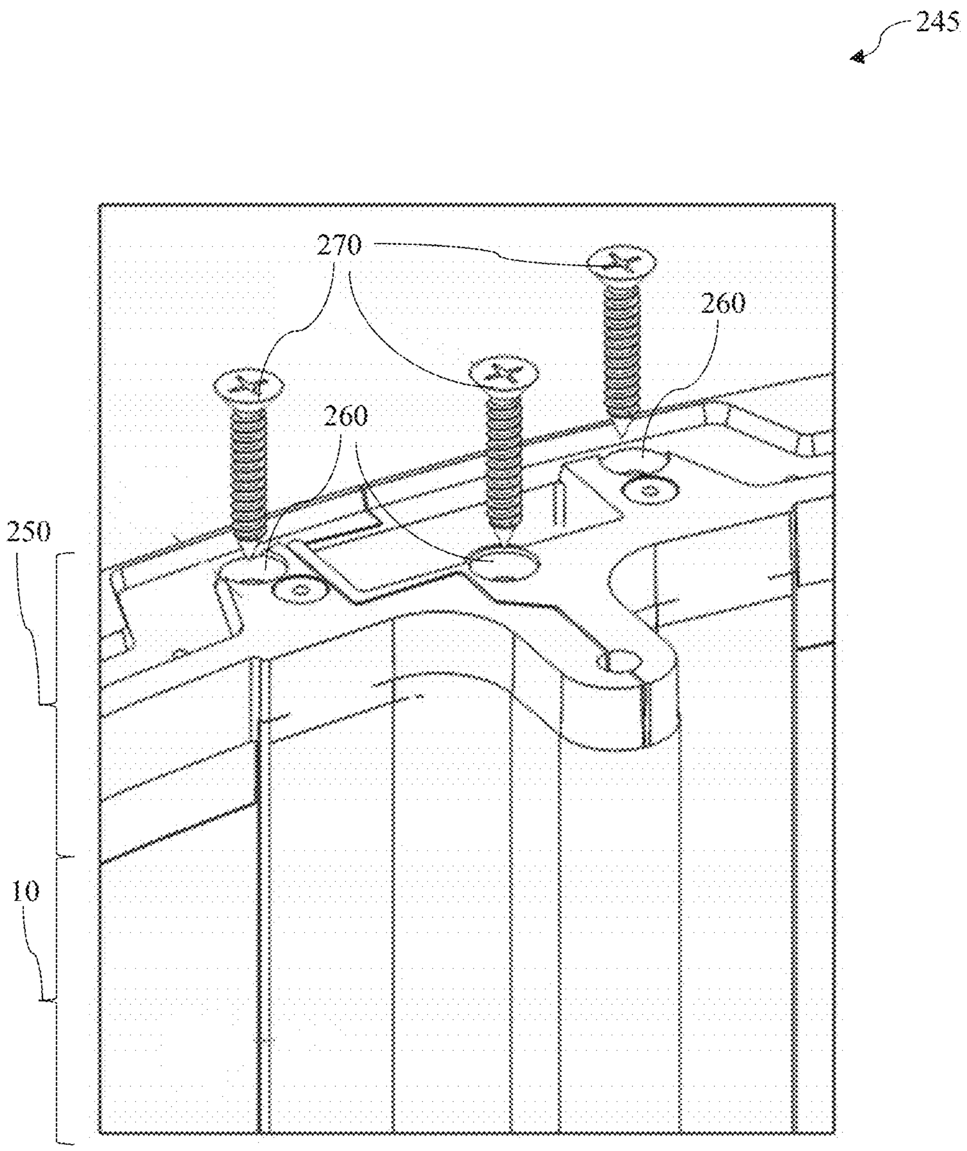
FIG. 7 is a schematic representation of an exemplary embodiment of an isometric view of a mechanically coupling of the structure of FIG. 1 or FIG. 4 with a base ring of the pneumatic vacuum elevator in accordance with an embodiment of the present disclosure.

FIG. 7 is a schematic representation of an exemplary embodiment of an isometric view of a mechanically coupling 245 of the structure 10 of FIG. 1 or FIG. 4 with a base ring 250 of the pneumatic vacuum elevator in accordance with an embodiment of the present disclosure. In one embodiment, the base ring 250 may include at least three holes 260, wherein the at least three holes 260 may enable fixing of the guide pillar system in a properly aligned position by mechanically coupling the central hollow pillar section 20 with the at least three grooved rib profiles 70 using the screwing mechanism. In such embodiment, the one or more screws used in the screwing mechanism may include at least three self-drilling screws 270. The connection of the guide pillar system with the base ring 250 and the external cylinder 135 through the at least three grooved rib profiles 70 improve the functioning of the guide pillar system in guiding the movement of the elevator cabin 140.

Figure 8:
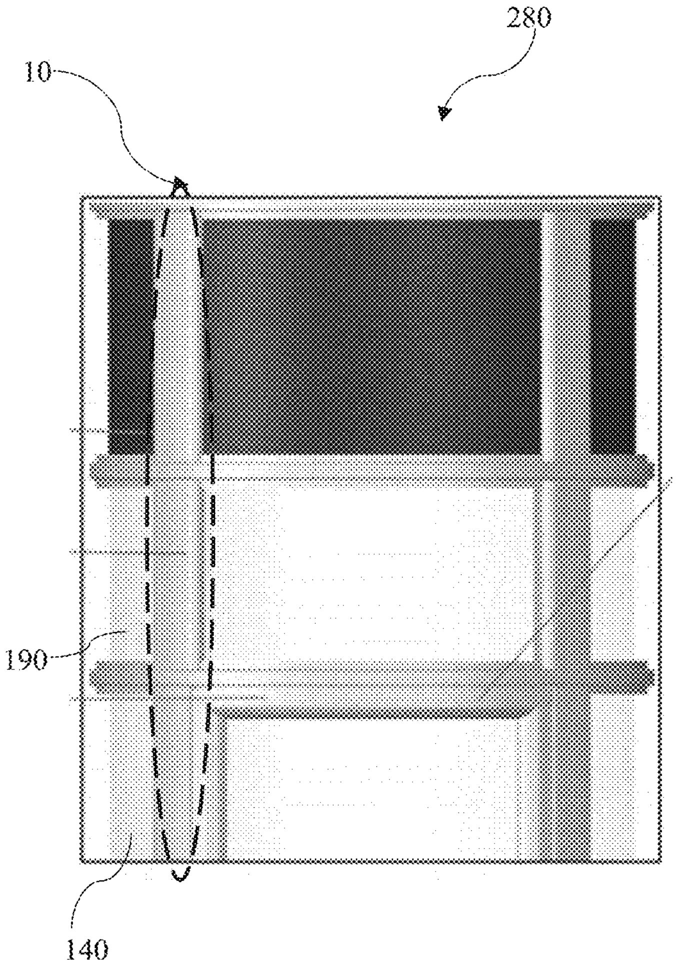
FIG. 8 is a schematic representation of an embodiment of a pneumatic vacuum elevator with the structure for the guide pillar system of FIG. 4 in accordance with an embodiment of the present disclosure.

FIG. 8 is a schematic representation of an embodiment of a pneumatic vacuum elevator 280 with the structure 10 for the guide pillar system of FIG. 4 in accordance with an embodiment of the present disclosure. The pneumatic vacuum elevator 280 includes the elevator cabin 140 adapted to carry a passenger for transiting across one or more floors of a building. The pneumatic vacuum elevator 280 also includes the external cylinder 135 positioned concentrically to the elevator cabin 140 externally. The external cylinder 135 includes the elevator door 240 adapted to allow entry and exit of the passenger corresponding to the elevator cabin 140.

Further, the pneumatic vacuum elevator 280 also includes the structure 10 for the guide pillar system mechanically coupled to the elevator cabin 140. The structure 10 includes the central hollow pillar section 20 positioned in the external cylinder 135 of the pneumatic vacuum elevator 280. The central hollow pillar section 20 includes the at least four sides including the first side 30, the second side 40, the third side 50, and the fourth side 60. The central hollow pillar section 20 also includes the at least three grooved rib profiles 70 adapted to mechanically couple the central hollow pillar section 20 to the one or more elevator components using the screwing mechanism. Each of the at least three grooved rib profiles 70 is attached to the inner surface of the first side 30, the second side 40, and the third side 50. The structure 10 also includes the at least one curved section 200 positioned at the first predefined portion of the outer surface of the first side 30 or the third side 50. The at least one curved section 200 is adapted to provide structural integrity and the radius edge to the first edge of the fourth side 60 of the central hollow pillar section 20. The fourth side 60 includes the second edge, wherein the second edge is adapted to receive the elevator door 240 of the external cylinder 135 of the pneumatic vacuum elevator 280.

Various embodiments of the present disclosure enable construction or assembling of the pneumatic vacuum elevator easier, as the construction of the guide pillar system is easy because of the structure of the corresponding guide rail system. Also, the structure requires low maintenance, as irregular shaping, welding process, and manual cutting process is avoided because of usage of the aluminum extrusion mechanism. Also, the structure enhances an aesthetic view of the pneumatic vacuum elevator, thereby making the structure a most preferable one. Further, the structure also provides lightweight to the guide pillar system, easing the handling process while installation and loading-unloading process.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A structure (10) for a guide pillar system of a pneumatic vacuum elevator (280), wherein the structure (10) comprises:

a central hollow pillar section (20) positioned in an external cylinder (135) of the pneumatic vacuum elevator (280), wherein the central hollow pillar section (20) comprises:

at least four sides comprising a first side (30), a second side (40), a third side (50), and a fourth side (60); and at least three grooved rib profiles (70) adapted to mechanically couple the central hollow pillar section (20) to one or more elevator components using a screwing mechanism, wherein each of the at least three grooved rib profiles (70) are attached to an inner surface of the first side (30), the second side (40), and the third side (50);

at least two curved sections (80) positioned at a first predefined portion of an outer surface of the first side (30) and the third side (50), wherein each of the at least two curved sections (80) are adapted to provide structural integrity and one or more radius edges to the fourth side (60) of the central hollow pillar section (20);

at least two single lip channeled sections (100) positioned at a second predefined portion of the outer surface of the first side (30) and the third side (50), wherein each of the at least two single lip channeled sections (100) comprises a first wall (110) and a second wall (120), wherein each of the at least two single lip channeled sections (100) are adapted to:

receive and support a covering sheet (190) of the external cylinder (135) of the pneumatic vacuum elevator (280) at the first wall (110); and receive and support a rubber beading (180) at the second wall (120).

2. The structure (10) as claimed in claim 1, comprises a rail section (90) extruded at an outer surface of the second side (40), wherein the rail section (90) is adapted to:

hold an elevator cabin (140) upon mechanically coupling the rail section (90) with a predefined groove (150) on the elevator cabin (140) via one or more coupling components; and guide the elevator cabin (140) in an upward direction and a downward direction based on predefined criteria.

3. The structure (10) as claimed in claim 2, wherein the one or more coupling components comprises at least one of a guide bracket (160), and a carpet layering (170).

4. The structure (10) as claimed in claim 1, wherein the rubber beading (180) is adapted to lock the covering sheet (190) of the external cylinder (135) of the pneumatic vacuum elevator (280) between the first wall (110) and the second wall (120).

5. A structure (10) for a guide pillar system of a pneumatic vacuum elevator (280), wherein the structure (10) comprises:

a central hollow pillar section (20) positioned in an external cylinder (135) of the pneumatic vacuum elevator (280), wherein the central hollow pillar section (20) comprises:

at least four sides comprising a first side (30), a second side (40), a third side (50), and a fourth side (60); and at least three grooved rib profiles (70) adapted to mechanically couple the central hollow pillar section (20) to one or more elevator components using a screwing mechanism, wherein each of the at least three grooved rib profiles (70) are attached to an inner surface of the first side (30), the second side (40), and the third side (50); and at least one curved section (200) positioned at a first predefined portion of an outer surface of the first side (30) or the third side (50), wherein the at least one curved section (200) is adapted to provide structural integrity and a radius edge to a first edge of the fourth side (60) of the central hollow pillar section (20), wherein the fourth side (60) comprises a second edge, wherein the second edge is adapted to receive an elevator door (240) of the external cylinder (135) of the pneumatic vacuum elevator (280);

at least one single lip channeled section (220) positioned at a second predefined portion of the outer surface of the first side (30) when the at least one curved section (200) is positioned on the third side (50) or the third side (50) when the at least one curved section (200) is positioned on the first side (30), wherein the at least one single lip channeled section (220) comprises a first wall (110) and a second wall (120), wherein the at least one single lip channeled section (220) is adapted to:

receive and support a covering sheet (190) of the external cylinder (135) of the pneumatic vacuum elevator (280) at the first wall (110); and receive and support a rubber beading (180) at the second wall (120).

6. The structure (10) as claimed in claim 5, comprises at least one projection (210) positioned on an outer surface of the first side (30) when the at least one curved section (200) is positioned on the third side (50) or the third side (50) when the at least one curved section (200) is positioned on the first side (30), wherein the at least one projection (210) is adapted to lock the elevator door (240) upon receiving the elevator door (240) at the second edge of the fourth side (60) of the central hollow pillar section (20).

7. The structure (10) as claimed in claim 5, comprises a rail section (90) extruded at an outer surface of the second side (40), wherein the rail section (90) is adapted to:

hold an elevator cabin (140) upon mechanically coupling the rail section (90) with a predefined groove (150) on the elevator cabin (140) via one or more coupling components; and guide the elevator cabin (140) in an upward direction and a downward direction based on predefined criteria.

8. The structure (10) as claimed in claim 5, wherein the rubber beading (180) is adapted to lock the covering sheet (190) of the external cylinder (135) of the pneumatic vacuum elevator (280) between the first wall (110) and the second wall (120).

9. A pneumatic vacuum elevator (280) with a structure (10) for a guide pillar system comprising:

an elevator cabin (140) adapted to carry a passenger for transiting across one or more floors of a building;

an external cylinder (135) positioned concentrically to the elevator cabin (140) externally, wherein the external cylinder (135) comprises an elevator door (240) adapted to allow entry and exit of the passenger corresponding to the elevator cabin (140);

the structure (10) for the guide pillar system mechanically coupled to the elevator cabin (140), wherein the structure (10) comprises:

a central hollow pillar section (20) positioned in the external cylinder (135) of the pneumatic vacuum elevator (280), wherein the central hollow pillar section (20) comprises:

at least four sides comprising a first side (30), a second side (40), a third side (50), and a fourth side (60); and at least three grooved rib profiles (70) adapted to mechanically couple the central hollow pillar section (20) to one or more elevator components using a screwing mechanism, wherein each of the at least three grooved rib profiles (70) are attached to an inner surface of the first side (30), the second side (40), and the third side (50); and at least one curved section (200) positioned at a first predefined portion of an outer surface of the first side (30) or the third side (50), wherein the at least one curved section (200) is adapted to provide structural integrity and a radius edge to a first edge of the fourth side (60) of the central hollow pillar section (20), wherein the fourth side (60) comprises a second edge, wherein the second edge is adapted to receive an elevator door (240) of the external cylinder (135) of the pneumatic vacuum elevator (280).

* * * * *